United States Patent [19]

Tamer

[11] Patent Number: 4,524,387
[45] Date of Patent: Jun. 18, 1985

[54] SYNCHRONIZATION INPUT FOR TELEVISION RECEIVER ON-SCREEN ALPHANUMERIC DISPLAY

[75] Inventor: Gregory G. Tamer, Indianapolis, Ind.

[73] Assignee: RCA Corporation, New York, N.Y.

[21] Appl. No.: 480,508

[22] Filed: Mar. 30, 1983

[51] Int. Cl.³ .............. H04N 5/10; H04N 5/06; H04N 5/50

[52] U.S. Cl. ................................. 358/154; 358/150; 358/192.1

[58] Field of Search ............. 358/183, 192.1, 150, 358/153, 145, 154

[56] References Cited

U.S. PATENT DOCUMENTS 4,263,610  4/1981  Shanley et al. ................. 358/20
4,485,404  11/1984  Tults ........................... 358/195.1

OTHER PUBLICATIONS

U.S. patent application Ser. No. 413,769, entitled A Digital AFT System Which is Activated During Vertical Retrace Intervals filed on Sep. 1, 1982 in the Name of Juri Tults and assigned to RCA Corporation.
EDN Magazine, Jan. 6, 1982, article by B. Albing, p. 207.
EDN Magazine, May 26, 1982, article by S. Bepko, p. 204.
EDN Magazine, Sep. 29, 1982, article by J. Gershfeld, p. 153.
Signal Processing Schematics of the RCA CTC 111 Series, Color Television Receiver Chassis, as published in RCA Television Service Data Bulletin No. C-3-S1 (1981) available from the RCA Consumer Electronics Division, Technical Publications, Indianapolis, Ind. (pp. 5 & 6 and 41-43).
Page 11 of "Digital Integrated Electronics", by H. Taub and D. Schilling, published by McGraw Hill in 1977.
Page 75 of "Basic Television Principles and Servicing", published by McGraw Hill in 1975.

Primary Examiner—John C. Martin
Assistant Examiner—Howard Carter
Attorney, Agent, or Firm—Eugene M. Whitacre; Peter M. Emanuel; Lawrence C. Edelman

[57] ABSTRACT

An arrangement for a television receiver is disclosed which facilitates the coupling of synchronization signals to an on-screen display integrated circuit of the receiver. The receiver includes sources of periodic vertical and horizontal rate pulses. A composite timing signal generator combines the vertical and horizontal rate pulses so as to form a composite timing signal in which the horizontal rate pulses are absent during the duration of each vertical rate pulse. The composite timing signal is coupled via a single conductor path to an input terminal of the on-screen display circuit. The composite timing signal can be readily decoded by a simple digital counter to provide separate horizontal and vertical rate pulses for the on-screen display circuit.

10 Claims, 6 Drawing Figures

SYNCHRONIZATION INPUT FOR TELEVISION RECEIVER ON-SCREEN ALPHANUMERIC DISPLAY

This invention concerns a circuit arrangement for developing a single, composite signal from which vertical and horizontal synchronization signals can be derived for use in a television receiver or similar video signal processing system requiring synchronization.

In a television receiver including a kinescope, there is a need for signal processing functions which require both vertical and horizontal synchronization information. For example, an on-screen display for providing channel number and time representative alphanumeric characters requires both vertical and horizontal synchronization information to locate the characters on the screen of the kinescope.

When the circuits requiring vertical and horizontal synchronization information are contained within an integrated circuit in whole or in significant part, it is herein recognized that it is desirable to provide a single composite synchronization signal from which separate vertical and horizontal synchronizing signal components can easily be derived. A single composite signal of this type is desirable since only a single external synchronization signal input terminal of the integrated circuit is required. This feature becomes increasingly important as more signal processing functions are incorporated on a single integrated circuit, since the demand for external input terminals is increased yet their number must necessarily be kept within reasonable limits.

While it may be thought that the composite synchronization signal obtained from the output of a conventional synchronization signal separator may be used for this purpose, that is not the case for several reasons. First, circuits for separating the complex conventional composite synchronization signal (including equalizing pulses) obtained from the output of the synchronization signal separator often require a capacitor which is not readily manufacturable within an integrated circuit. Furthermore, since such circuits are responsive to the received television signal, when there is no television signal received for a selected channel, vertical and horizontal synchronization will not be available. This is of particular importance in an on-screen display system for providing channel and time information since such information is desirable even when there is no television signal received for a particular channel or at a particular time of day.

In accordance with the principles of the present invention, in a television system including a kinescope, a free-running horizontal oscillator and a synchronization circuit for synchronizing the horizontal oscillator with a conventional composite synchronization component of a received television signal when such television signal is present, a deflection system for deriving separate horizontal and vertical rate pulses for controlling the deflection of electron beams of the kinescope, and a signal processing circuit requiring synchronization with the horizontal and vertical rate pulses for synchronizing an information display on the screen of the kinescope, circuitry is provided for combining the vertical and horizontal rate pulses so as to form a composite timing signal. In particular, the horizontal and vertical rate pulses are combined in the composite timing signal so that the horizontal rate pulses are absent during the duration of the vertical rate pulses. The composite timing signal is coupled via a single connection path to a synchronizing signal input of the signal processing circuit.

In accordance with a further aspect of the invention, a counter circuit in the signal processing circuit is responsive to the composite timing signal for deriving the vertical rate pulses upon sensing the absence of the horizontal rate pulses.

In accordance with still a further aspect of the invention, the vertical and horizontal rate pulses are derived from the portion of the television system which provides kinescope blanking pulses which are used for blanking the screen of the kinescope during vertical and horizontal retrace intervals.

Figure 1:
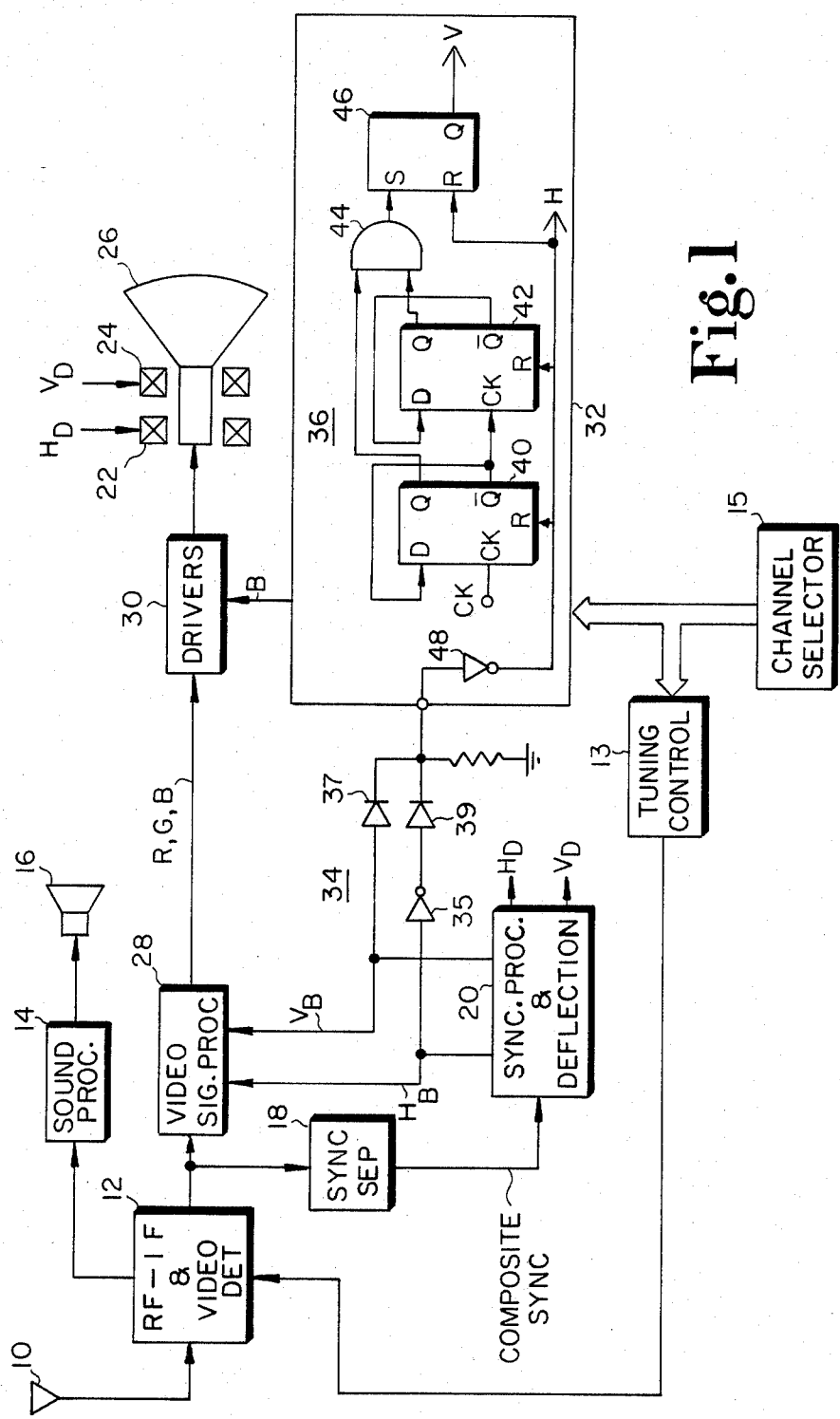
FIG. 1 illustrates, partially in block diagram form and partially in schematic diagram form, a television receiver including a composite synchronization signal generator for an on-screen display system constructed in accordance with the principles of the present invention.

In FIG. 1, RF television signals received by an antenna 10 are applied to a section 12 of a television receiver, including an RF signal tuner, an IF stage and a video detector arranged in conventional fashion, for producing a composite video signal at baseband. The tuning portion of unit 12 selects and heterodynes the particular RF signal corresponding to a selected channel in response to a tuning voltage. The tuning voltage is generated by a tuner control unit 13 in response to coded binary signals representing the channel number of the selected channel generated by a channel selector 15.

A sound processing circuit 14 is responsive to the IF signal processed in the IF stage of section 12 for providing an audio signal to a speaker 16 for reproducing the aural content of the received channel. A synchronization (sync) signal separator 18 is responsive to the baseband video signal for forming a composite sync signal including horizontal and vertical sync pulses for application to sync processing and deflection circuitry 20. Circuitry 20 develops horizontal deflection ($H_D$) and vertical deflection ($V_D$) signals which are applied to horizontal and vertical coils 22 and 24 of a kinescope arrangement 26 for scanning a raster on its screen. The detected video signal is also applied to video signal processing circuitry 28 for developing red, green and blue (R, G, B) color signals which are applied to electron guns of kinescope 26 via driver circuitry 30. Sync processing and deflection circuit 20 also develops horizontal and vertical rate blanking signals ($H_B$, $V_B$) which are applied to video signal processor 28 for blanking the video signal during horizontal and vertical deflection retrace intervals.

Unit 20 includes a free-running horizontal oscillator (not shown) for generating a signal having a frequency which is a multiple of the horizontal line frequency and a synchronization system commonly known as an automatic phase and frequency control (AFPC) loop for synchronizing the horizontal oscillator with the sync pulses of the composite sync signal produced by sync separator 18. The horizontal and vertical drive signals ($H_D$ and $V_D$) are derived by counters from the output signal of the horizontal oscillator. The horizontal and vertical blanking signals occur during the retrace intervals of the horizontal and vertical drive signals. Because the horizontal oscillator is free-running, the horizontal and vertical drive and blanking signals are always present even where there is no received signal and therefore no composite sync signal produced by sync separator 18.

An on-screen display of the channel number on the screen of kinescope 26 is provided by an on-screen display (OSD) circuit 32 which for that purpose receives the binary coded channel number representative signals from channel selector 15. OSD circuit 32 is responsive to the horizontal and vertical blanking signals coupled via a circuit 34, constructed in accordance with the present invention, for developing a blanking signal B which is applied to drivers 30 for selectively blanking the video signal so as to develop display of the alphanumeric characters at a desired portion of the screen of kinescope 26. The television receiver described thus far (except for unit 34) is conventional in nature and may comprise, for example, the RCA television chassis CTC 111, described in RCA Television Service Data—Chassis CTC 111, C-3, S-1 series. By way of example, OSD 32 (except for circuitry 36 to be described below) may comprise type MM 58146 OSD integrated circuit available from National Semiconductor Corporation, Santa Clara, Calif. That IC also includes a clock circuit for producing an on-screen display of the present time. The operation of such OSD circuitry which is suitable for use in the CTC 111 television chassis is described in greater detail in U.S. Pat. No. 3,984,828 entitled "CHARACTER GENERATOR FOR TELEVISION CHANNEL NUMBER DISPLAY WITH EDGING PROVISIONS", issued in the name of B. W. Beyers on Oct. 5, 1976.

Figure 2:
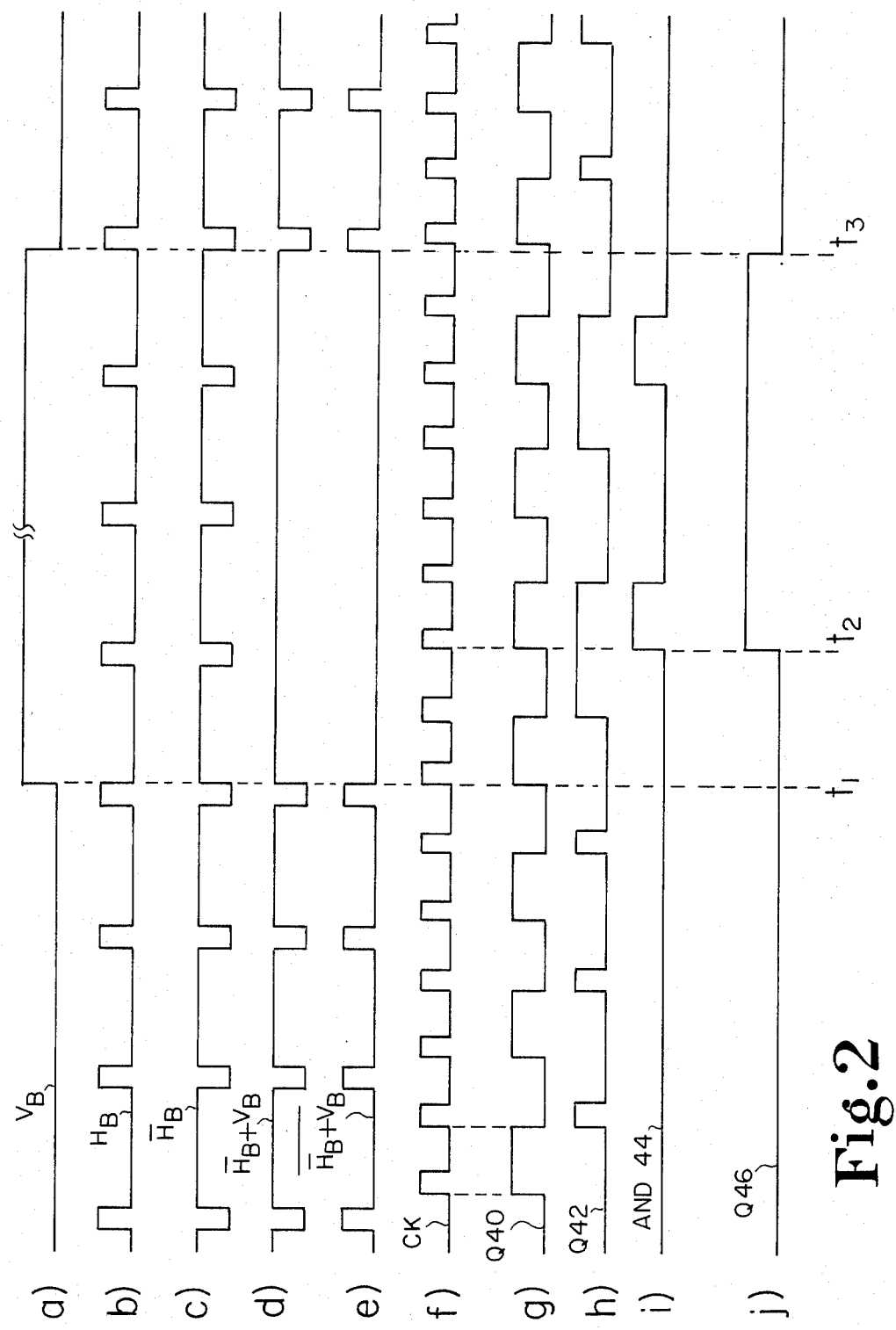
FIG. 2 illustrates signal waveforms useful in understanding the operation of the arrangement shown in FIG. 1.

In accordance with the principles of the present invention, a composite signal generator 34 develops a composite timing signal including the horizontal and vertical synchronization components. When OSD circuit 32 is included in an integrated circuit, only a single input terminal of the integrated circuit is required to receive these synchronization components. A decoder 36 is responsive to the composite timing signal for providing separate horizontal and vertical rate pulses to respective horizontal and vertical rate counters (not shown) within OSD circuit 32 for synchronizing the generation of the blanking signal B so as to properly position the display of the alphanumeric information on the screen of kinescope 26. The coupling and decoding of the horizontal and vertical rate signals to OSD circuit 32 will next be described in conjunction with the signal waveforms of FIG. 2.

Circuit 34 comprises an OR gate including diodes 37 and 39 responsive to the vertical blanking signal $V_B$ (waveform 2a) and the inverted horizontal blanking signal $\overline{H}_B$ (waveform 2c) derived by an inverter 35 from the horizontal blanking signals $H_B$ (waveform 2b). The composite timing signal provided at the output of circuit 34 (waveform 2d) does not include any horizontal blanking pulses during the vertical blanking intervals.

Decoder 36 comprises D type flip-flops 40 and 42, an AND gate 44, a set-reset flip-flop 46 and an inverter 48, for counting clock pulses CK (waveform 2f) which are locally generated by a clock generator (not shown) within OSD 32. Inverter 48 applies an inverted composite timing signal (waveform 2e) to the reset inputs of flip-flops 40, 42 and 46. This inverted signal includes only horizontal rate pulses and thus is used by the horizontal rate counter of OSD circuit 32 for synchronization purposes directly without further decoding being necessary.

Since the $\overline{Q}$ output of flip-flop 40 is coupled to its D input, flip-flop 40 provides output pulses at its Q output (waveform 2g) at ½ the rate of the clock pulses CK (waveform 2f) as long as it is not reset. The $\overline{Q}$ output of flip-flop 40 is the clock input to flip-flop 42. The $\overline{Q}$ output of flip-flop 42 is coupled to its D input. The Q outputs of flip-flops 40 and 42 (waveforms 2g and 2h) are coupled to inputs of AND gate 44. The output of AND gate 44 (waveform 2i) is coupled to the set (S) input of set-reset flip-flop 46.

Upon comparison of the waveforms it is seen that after time t1, horizontal rate pulses are no longer applied to the reset (R) inputs of the flip-flops. When three clock pulses have been applied to flip-flop 40 after time t1, the Q output of flip-flops 40 and 42 will both be high and AND gate 44 will provide a high logic level at time t2 to the set (S) input of flip-flop 46. This initiates a vertical rate pulse at the Q output of flip-flop 46 (waveform 2j). Upon the resumption of the horizontal rate pulses of the composite timing signal at time t3, a high logic level signal is applied, via inverter 48, to the reset input of flip-flop 46. This causes its Q output to return low and thus terminate the vertical blanking pulse (waveform 2j) at time t3. This vertical rate pulse is used to reset a vertical rate counter (not shown) within OSD circuit 32.

Note that OR gate 34 is responsive to the horizontal and vertical blanking signals generated by sync and processing and deflection unit 20 for deriving the composite timing signal. Accordingly, for the reasons explained before, even in the absence of the composite sync signal produced by sync separator 18, channel (and time) information can be provided by OSD 32. If, on the other hand, the composite sync signal provided by sync separator 18 were used to provide synchronization information to the OSD circuits, when no RF signal was being received, no channel (and time) information would be displayed.

In summary, because the composite timing signal (waveform 2d) provided at the output of combining circuit 34 includes only horizontal rate pulses and vertical rate pulses (i.e., no horizontal rate pulses occur during the vertical rate pulses), the composite timing signal can be readily decoded. To decode the composite timing signal, in essence, decoder 36 comprises a counter which provides a high output signal (at the output of AND gate 44) indicative of a detected vertical pulse if three clock pulses are counted between pulses of the composite timing signal. If, however, a horizontal rate pulse of the composite timing signal occurs before three clock pulses occur, the counter is reset and the output (at the output of AND gate 44) remains low. The upper frequency of the clock signal CK is 31 KHz since the minimum time for two clock pulses or three leading edges of the clock pulses to occur is 63.5 microseconds, i.e., the time interval between horizontal blanking pulses. The lower frequency limit of the clock pulse is 4 KHz since at least three clock pulses must occur during the vertical blanking interval of 510 microseconds.

Figure 3A:
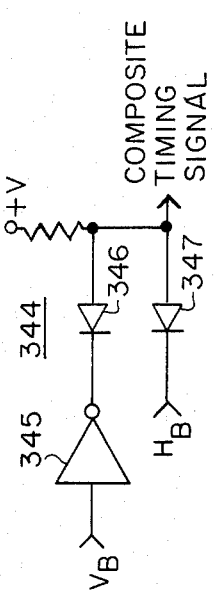
FIGS. 3($a$) through ($d$) illustrate alternative embodiments of the composite synchronization signal generator of FIG. 1 and corresponding waveforms.
Figure 3B:
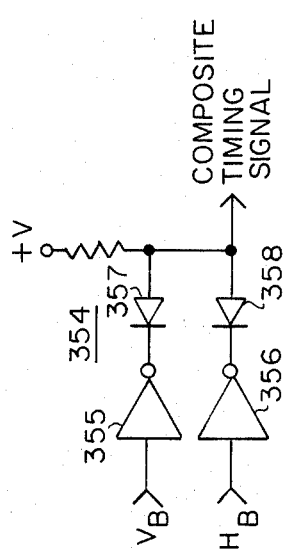
Figure 3C:
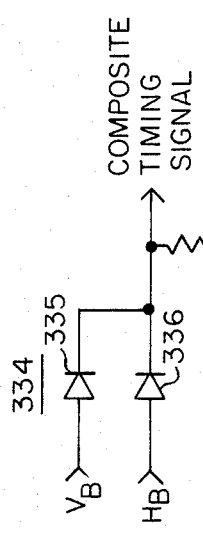
Figure 3D:
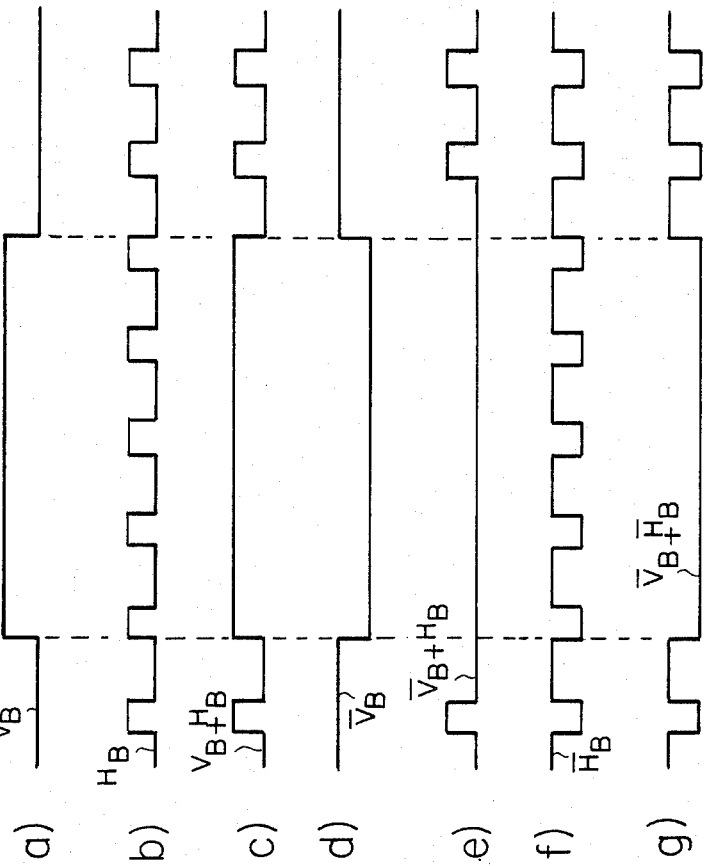

Other circuits for combining the vertical and horizontal blanking pulses to produce a composite timing signal with a vertical interval without horizontal pulses that can be decoded in the same manner are shown in FIGS. 3a, b and c and waveforms useful in understanding their operation are shown in FIG. 3d.

In FIG. 3a, a combining circuit 334 including diodes 335 and 336 (without an inverter) can be substituted for combining circuit 34 of FIG. 1. In this example, the vertical and horizontal blanking signals illustrated in waveforms 3a and 3b, respectively, are combined to generate the composite timing signal illustrated in waveform 3c. This composite timing signal can be directly applied to decoder 36 for generating the vertical and horizontal rate signals in the same manner as described with respect to FIG. 1.

In FIG. 3b, in a combining circuit 344, the vertical blanking pulses are inverted by an inverter 345 to produce inverted vertical blanking pulses (waveform 3d) and "ORed" with noninverted horiozntal blanking pulses (waveform 3b) by an OR gate, including diodes 346 and 347, which responds to low level pulses to generate the composite timing signal illustrated in waveform 3e. With this composite timing signal, inverter 48 of decoder 36 is not required for proper operation of decoder 36 and can be bypassed.

As shown in FIG. 3d, inverted horizontal and inverted vertical blanking pulses (waveforms 3d and 3f) can be combined by a combining circuit 354, including inverters 355 and 356 and diodes 357 and 358, for generating the composite timing signal illustrated in FIG. 3g. The composite timing signal shown in FIG. 3g, like the composite timing signal shown in FIG. 3e, does not require the use of inverter 48 for proper operation of decoder 36.

What is claimed is:

1. In a television system including an image display device, apparatus comprising:
   deflection means responsive to a composite video signal including a composite synchronization signal for developing vertical and horizontal rate pulses for positioning picture elements on the screen of said display device even in the absence of said composite video signal;
   a signal processing circuit requiring vertical and horizontal synchronization information;
   a combining means for combining said vertical and horizontal rate pulses so as to form a composite timing signal in which said horizontal rate pulses are absent during the duration of said vertical rate pulses;
   a single conduction path for coupling said composite timing signal to said signal processing circuit; and
   a decoder included in said signal processing section for generating separate vertical and horizontal signals corresponding to said vertical and horizontal rate pulses.

2. The apparatus according to claim 1 wherein:
   said decoder includes a counter responsive to a clock signal for counting pulses of said clock signal and responsive to said composite timing signal for being reset by pulses thereof, said counter providing said vertical signal if said counter reaches a predetermined count; and means for directly providing said composite timing signal as said horizontal signal.

3. The apparatus according to claim 2 wherein:
   said combining means comprises an OR function circuit responsive to said vertical and horizontal rate signals.

4. The apparatus according to claim 3 wherein:
   said deflection means produces horizontal and vertical rate blanking signals for periodically blanking said display device, said periodic horizontal and vertical rate signals corresponding to said blanking signals.

5. The apparatus according to claim 4 wherein:
   said combining means includes an inverter for applying inverted horizontal blanking pulses to one input of said OR function circuit and a signal coupling path for applying noninverted vertical blanking pulses to the other input of said OR function circuit.

6. The apparatus according to claim 5 wherein:
   said counter circuit includes two cascaded D type flip-flops each arranged as a divide-by-two circuit, the first D type flip-flop receiving said clock signal at its clock input and said second D type flip-flop receiving the inverting output of said first D type flip-flop; and
   a set-reset flip-flop, having a set input responsive to the noninverting outputs of said first and second D type flip-flops; each of the reset inputs of said D type flip-flops and said set-reset flip-flop being responsive to said composite timing signal.

7. The apparatus according to claim 3 wherein:
   said signal processing circuit is an integrated circuit and said single conductor path is an input terminal of said integrated circuit.

8. The apparatus according to claim 7 wherein:
   said integrated circuit comprises an on-screen display integrated circuit for displaying characters on the screen of said display device.

9. In a display system requiring vertical and horizontal synchronization, apparatus comprising:
   means for developing separate vertical and horizontal rate pulses;
   combining means for combining said vertical and horizontal rate pulses so as to form a composite timing signal in which said horizontal rate pulses are absent during the duration of said vertical rate pulses;
   signal processing means; and
   a single conduction path for coupling said composite timing signal to said signal processing means;
   said signal processing means including decoder means for generating separate vertical and horizontal signals corresponding to said vertical and horizontal rate pulses.

10. The apparatus according to claim 9 further including an image display device and wherein:
    said means for developing said separate vertical and horizontal rate pulses comprises a deflection circuit normally responsive to a composite video signal including a composite synchronization signal component for developing said vertical and horizontal rate pulses for positioning picture elements on the screen of said image display device even in the absence of said composite video signal.

* * * * *